US012162269B2

(12) United States Patent
De Roeck

(10) Patent No.: US 12,162,269 B2
(45) Date of Patent: Dec. 10, 2024

(54) INKJET PRINTER FOR DECORATING CLOTH

(71) Applicant: AGFA NV, Mortsel (BE)

(72) Inventor: Luc De Roeck, Mortsel (BE)

(73) Assignee: Agfa NV, Mortsel (BE)

( * ) Notice: Subject to any disclaimer, the term of this patent is extended or adjusted under 35 U.S.C. 154(b) by 170 days.

(21) Appl. No.: 17/799,970

(22) PCT Filed: Feb. 1, 2021

(86) PCT No.: PCT/EP2021/052277
§ 371 (c)(1),
(2) Date: Aug. 16, 2022

(87) PCT Pub. No.: WO2021/165024
PCT Pub. Date: Aug. 26, 2021

(65) Prior Publication Data

US 2023/0069706 A1 Mar. 2, 2023

(30) Foreign Application Priority Data

Feb. 18, 2020 (EP) .................................... 20157950
Mar. 11, 2020 (EP) .................................... 20162290

(51) Int. Cl.
*B41J 11/00* (2006.01)
*B41J 3/407* (2006.01)

(52) U.S. Cl.
CPC ......... *B41J 11/0085* (2013.01); *B41J 3/4078* (2013.01)

(58) Field of Classification Search
CPC ...... B41J 11/0085; B41J 3/4078; B41J 13/08; B41J 15/048; B41J 15/04; B41J 11/0005; B41J 11/007
See application file for complete search history.

(56) References Cited

U.S. PATENT DOCUMENTS 5,625,398 A 4/1997 Milkovits et al.
2002/0060408 A1 5/2002 Yraceburu et al.
2009/0167833 A1 7/2009 Mochizuki
2015/0124034 A1* 5/2015 Shinoda ................ B41J 3/4078 347/104

(Continued)

FOREIGN PATENT DOCUMENTS

CN 104031476 A 9/2014
CN 110621508 A 12/2019

(Continued)

OTHER PUBLICATIONS

Ikagawa, MachineTranslationofCN-110654114-B, 2021 (Year: 2021).*

(Continued)

*Primary Examiner* — Scott A Richmond
(74) *Attorney, Agent, or Firm* — Leydig, Voit & Mayer, Ltd.

(57) ABSTRACT

An inkjet printer (500) for printing on cloth (300) comprising a first vacuum belt (150) for conveying an unwoven fabric (200) which is, configured as a second vacuum belt, for conveying under an inkjet print head (505) a cloth (300); and a device for applying pressure to said cloth (300) on said second vacuum belt; wherein said device comprises a portion for traversing said cloth (300) with a rub by a relative movement between said pressure device and said second vacuum belt, carrying said cloth (300).

20 Claims, 4 Drawing Sheets

(56) References Cited

U.S. PATENT DOCUMENTS

| | | | | |
|---|---|---|---|---|
| 2019/0240997 | A1 | 8/2019 | De Roeck | |
| 2019/0270320 | A1* | 9/2019 | De Roeck | B41J 3/407 |
| 2020/0023656 | A1* | 1/2020 | Bonjoch | B41J 11/70 |

FOREIGN PATENT DOCUMENTS

| | | | | | |
|---|---|---|---|---|---|
| CN | 110654114 | B | * | 4/2021 | B41J 11/007 |
| CN | 113795385 | A | | 12/2021 | |
| DE | 10356810 | A1 | | 7/2005 | |
| EP | 3275677 | A1 | | 1/2018 | |
| EP | 3403838 | A1 | | 11/2018 | |
| EP | 3450574 | A1 | | 3/2019 | |
| JP | 2003-516257 | A | | 5/2003 | |
| KR | 101605464 | B1 | * | 3/2016 | |
| WO | WO 2001/042030 | A2 | | 6/2001 | |
| WO | WO-2018087119 | A1 | * | 5/2018 | B41J 11/007 |
| WO | WO 2020/225050 | A1 | | 11/2020 | |

OTHER PUBLICATIONS

Oh Hee Taek, Machine TranslationofKR-101605464-B1, 2016 (Year: 2016).*

European Patent Office, International Search Report in International Patent Application No. PCT/EP2021/052277, mailed Apr. 26, 2021, 4 pp.

European Patent Office, Written Opinion in International Patent Application No. PCT/EP2021/052277, mailed Apr. 26, 2021, 9 pp.

* cited by examiner

INKJET PRINTER FOR DECORATING CLOTH

CROSS-REFERENCE TO RELATED APPLICATIONS

This patent application is the U.S. national phase of copending International Patent Application No. PCT/EP2021/052277, filed Feb. 1, 2021, which claims the benefit of European Patent Application Nos. 20157950.5, and 20162290.9, filed Feb. 18, 2020 and Mar. 11, 2020, respectively.

TECHNICAL FIELD

The present invention relates to the manufacturing of decorated cloth by an inkjet printer, which may be part of a manufacturing line.

Cloth is pliable material made usually by weaving, felting, or knitting natural or synthetic fibres and filaments.

BACKGROUND ART

Cloth has been decorated in the past by screen printing. However, screen printing is labour intensive as for each colour an individual screen is required. This is costly and time consuming, especially when personalization or customization is desired.

Digital printing technologies on cloth have been investigated but many solutions for applying cloth in a digital printer is still a hard nut to crack due to folds and wrinkles while transporting or applying cloth on a support during, before and after printing.

The handling of cloth on a support of an inkjet printer is not easy due to forces between intertwined fibres and filaments of said cloth. Said forces cause wrinkles, even while printing, and said wrinkles result in regular collisions with the print heads of said printer. Enlarging the throw distance may overcome said collisions but this results in blurry inkjet printed decorative images. A vacuum support may help flattening the cloth but said forces and the filaments, results in uncontrolled holding of said cloth against the vacuum support, especially at the edges of said cloth. It is known in the that edges of said cloth are taped against the vacuum support, if said cloth is not a continuous sheet of cloth but single piece of cloth.

Using a sticky non-permeable support for adhering the cloth and wherein said sticky non-permeable support is hold onto a vacuum support of a printer is a known method of supplying cloth in an inkjet printer. But said stickiness makes it hard for (re)positioning said cloth on said non-permeable support and the cloth has a contamination of glue after removing the cloth from said non-permeable support, which have to be cleaned in an extra step. Also the sticky layer from said non-permeable support have to be renewed or said non-permeable support is a consumable that may be reused only once or maximum two times, which results in manufacturing waste.

Using a sticky conveyor belt for transporting and/or holding down cloth during printing is also a known method but here also the sticky layer on said conveyor belt have to be renewed/cleaned which results in waste and lost time during manufacturing. An example of such sticky conveyor belt is applied in EFI™ Reggiani™ fabric printing solution EFI Reggiani PRO 180.

Hence, there is a need for obtaining a reliable inkjet printer for performing an efficient and faster method for high quality decorating cloth wherein the method avoids collisions against expensive print heads and easy and fast mounting of the cloth in a digital printer.

SUMMARY OF INVENTION

In order to overcome the problems described above, preferred embodiments of the present invention have been realised with an inkjet printer which is suitable for decorating cloth according to claim 1.

The present invention may be part of a manufacturing line for decorated cloth, wherein said manufacturing line may comprise other decoration techniques such as cooling, airblowing, embossing, laser ablating, laser marking, top coating . . . and it may comprise post print techniques such as cutting, folding, perforating and sewing. An object of the present invention is thus also a manufacturing method for decorated cloth.

An object of the present invention is also a cloth article. Said cloth article includes then a decorated cloth manufactured by said manufacturing line or decorated by said inkjet printer. The cloth may be an apparel or a part of an apparel or a part of a plurality of panels from an apparel, preferably an on-demand apparel.

The inkjet printer of the present invention comprises two vacuum belts:

- a first vacuum belt (150) for conveying a second belt which is suitable for conveying under an inkjet print head (505) a cloth. Said inkjet print head (505) is for printing an image on said cloth as decoration or as identification. The cloth is preferably a continuous sheet of cloth also called a web of cloth.

The second vacuum belt is a vacuum belt and more preferably an unwoven fabric (200) configured as vacuum belt. WO2018/087119 (AGFA NV) discloses a comparable inkjet printer with such 'twin belt system'.

To have a good holding of the cloth on the unwoven fabric (200), which hereby, configured as a second vacuum belt, the inkjet printer of the present invention has a device for applying pressure to said cloth on said second vacuum belt; wherein said device comprises a portion for traversing said cloth with a rub by a relative movement between said pressure device and said second vacuum belt, carrying said cloth. The portion traverses hereby a side of the cloth wherein it moves along the surface of said side with pressure (=rub) during a period.

The unwoven fabric (200) is air-permeable on itself so there is no need for additional perforations. The air permeability of the unwoven fabric (200) is preferably below 90 L/(dm$^2$×min) and higher than 15 L(dm2×min) at 200 Pa difference pressure.

It is further found that a felt as unwoven fabric (200) gives the best results for holding down the cloth against said felt. The felt preferably has no sticky layer because there is need for and this results in glue contamination on the cloth. The felt is preferably polyester felt.

These and other objects of the present invention will become apparent from the detailed description hereinafter.

BRIEF DESCRIPTION OF DRAWINGS

In FIG. 2 is the unwoven fabric (200) wrapped around an upstream gliding support (805) and a downstream gliding support (807). In FIG. 3 and FIG. 4 is the unwoven fabric (200) wrapped around a plurality of pulleys (815, 817).

In FIG. 4 extra features are added to a preferred embodiment of the inkjet printer: a media set bar (600), camera-system (1004), a cutter (1005) and wash station (1008).

In FIG. 6 a plurality of cloths (300) are carried on an unwoven fabric (200), configured as vacuum belt. Said vacuum belt is carried on another vacuum belt (150). The cloth (300) has a front side (350); which shall be decorated and a back side having fibers and filaments. The unwoven fabric (200) has a fibrous layer (250) which is in contact with said back side having fibers and filaments.

In FIG. 7 an image (305) is inkjet printed on one cloth (350). The unwoven fabric (200) consists herein by one fibrous layer.

DESCRIPTION OF EMBODIMENTS

Cloth

Figure 1:
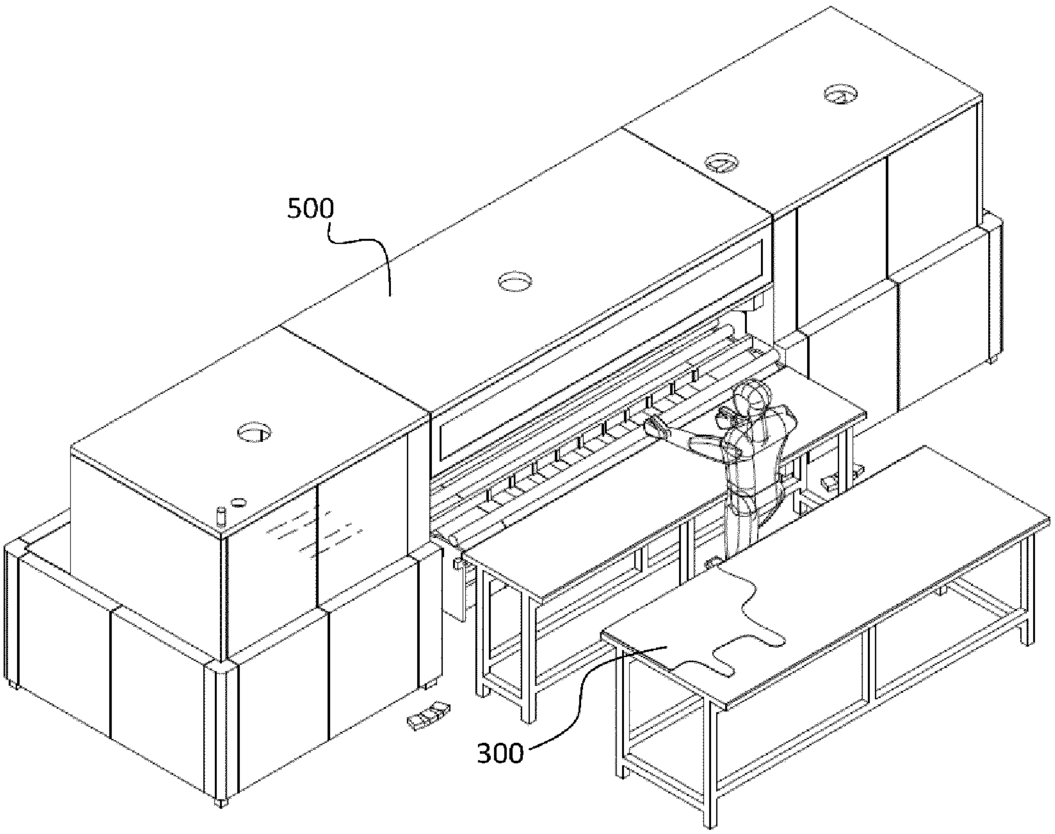
FIG. 1 illustrates an inkjet printer (500) adapted according the present invention for inkjet printing on cloth (300). Said inkjet printer illustrates a TAURO™ from manufacturer AGFA NV.
Figure 2:
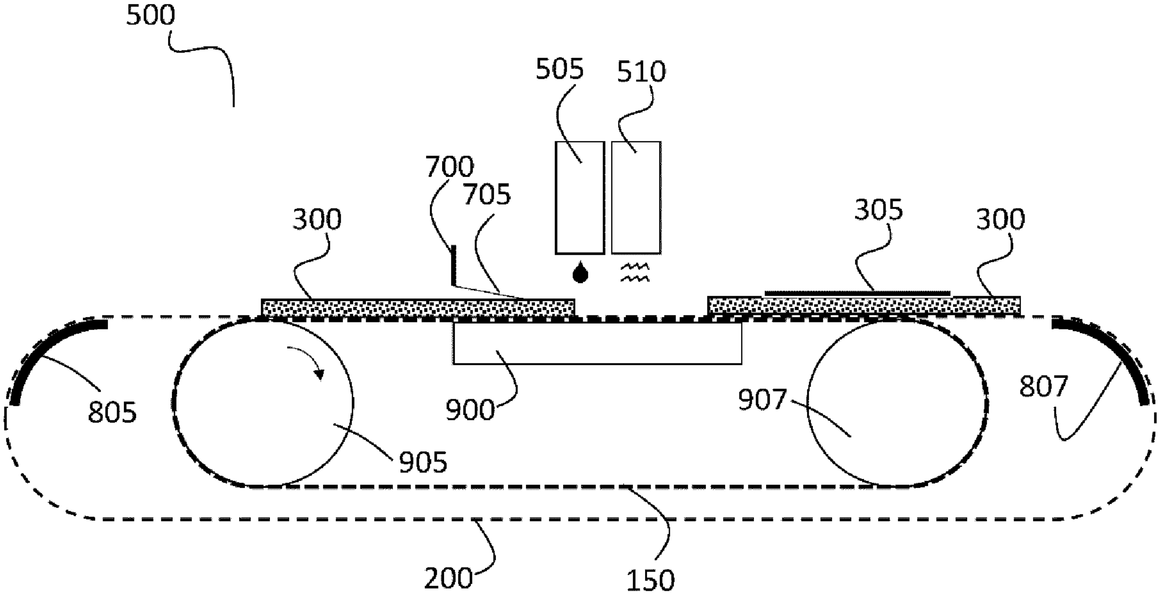
FIG. 2, FIG. 3 and FIG. 4 illustrate a cross-cut from preferred embodiments of the present invention wherein a print head (505) of an inkjet printer (500), not viewed, prints an image (305) and a dryer (510) dries said image (305) on cloth (300). Said cloth is conveyed on an unwoven fabric (200), configured as a vacuum belt. Said unwoven fabric (200) is conveyed by another vacuum belt (150). Said other vacuum belt (150) is wrapped around an upstream pulley (905); downstream pulley (907) and a vacuum table (900). The conveying of the cloth (300) for printing goes from left to right as illustrated by the arced arrow. The cloth (300) is pressed on the unwoven fabric (200) by a pressure device (700) having a portion (705), here illustrated as flat portion.
Figure 3:
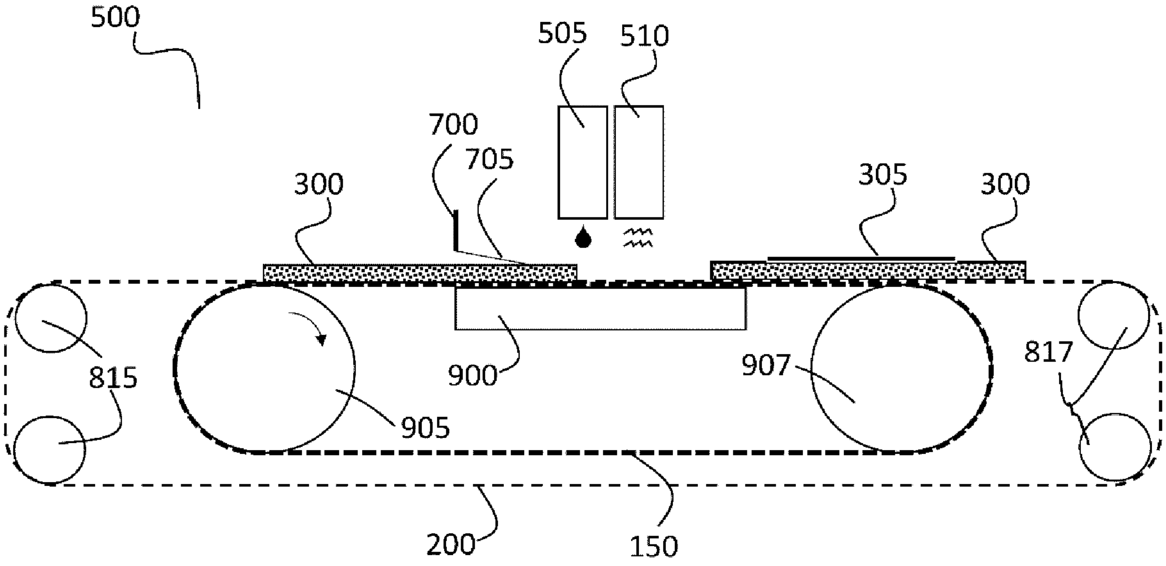
Figure 4:
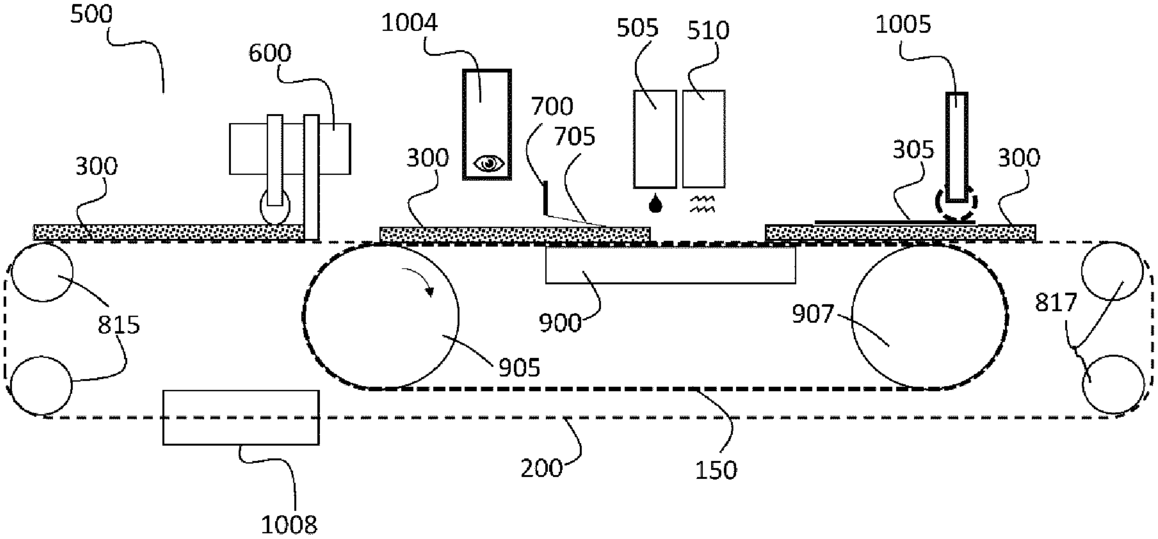
Figure 5:
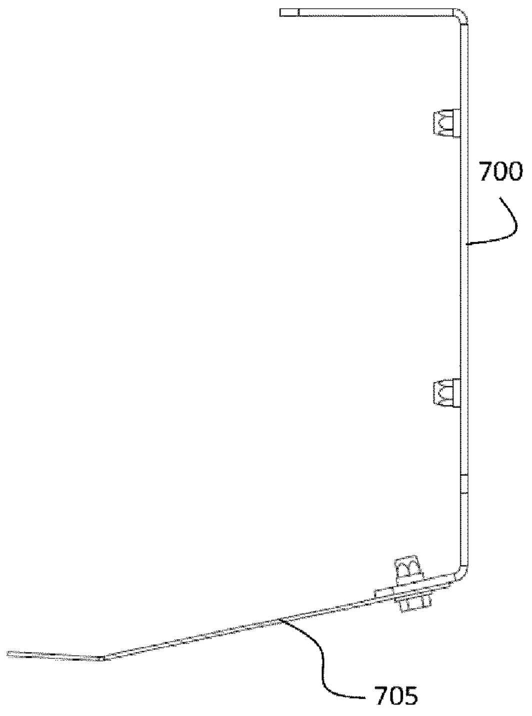
FIG. 5 illustrates a cross-cut of a pressure device (700) having a portion (705) from a preferred embodiment of the present invention.
Figure 6:
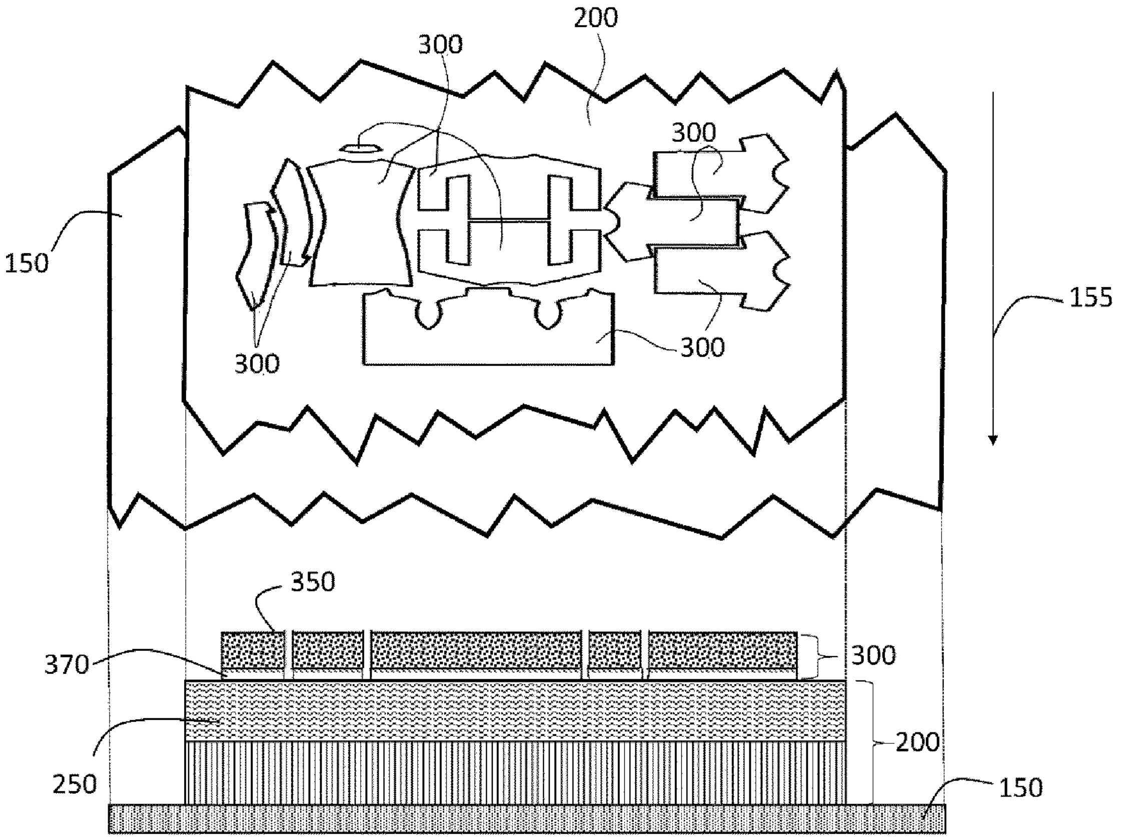
FIG. 6, FIG. 7 illustrates a top view- and cross-cut of preferred embodiments of the present invention.
Figure 7:
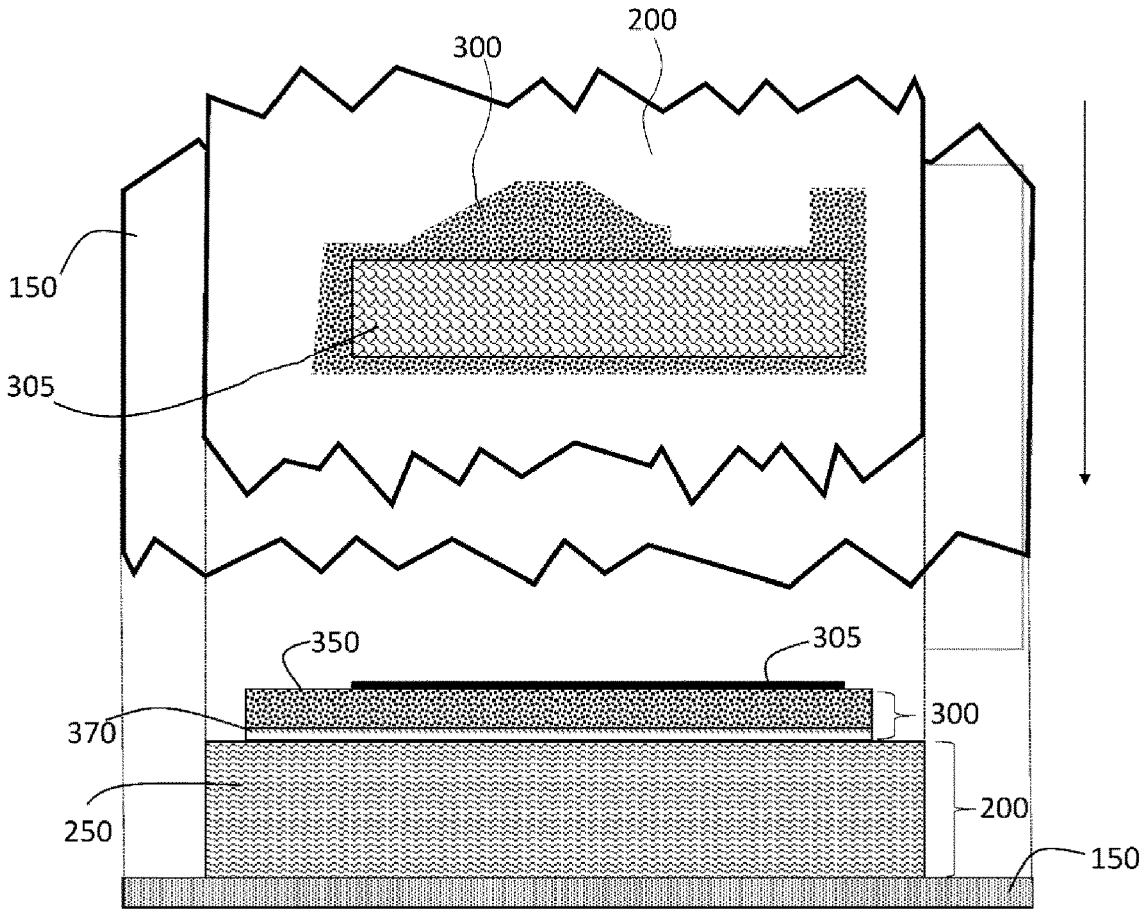
Figure 8:
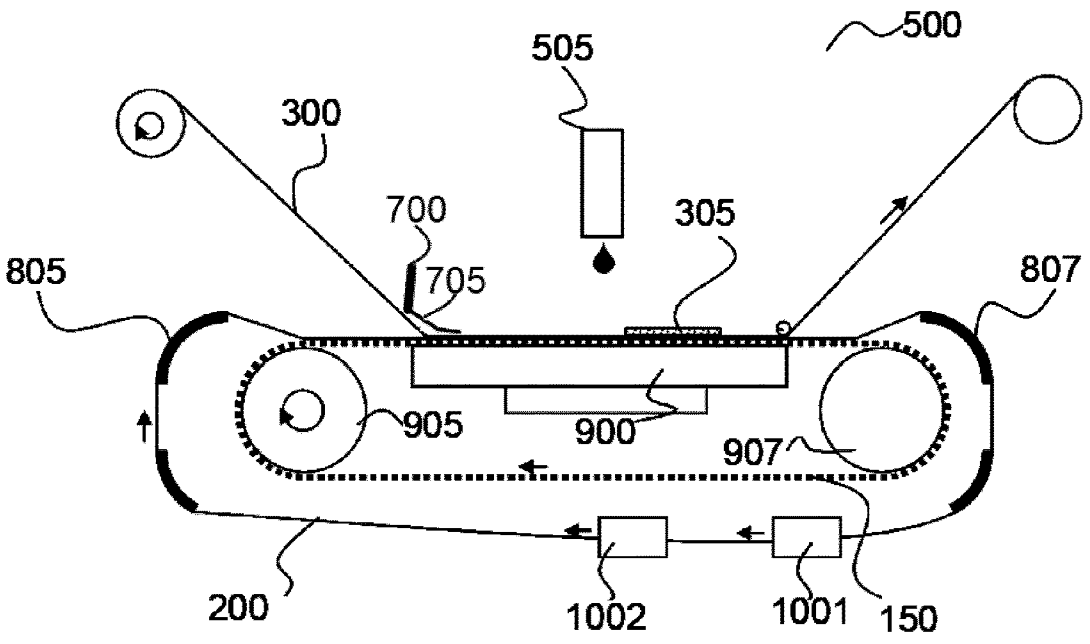
FIG. 8 discloses a preferred embodiment of the present invention whereby the cloth (350) is a continuous sheet of cloth and the unwoven fabric (200) may be cleaned in a cleaning station (1001) for ink debris and washed in a washing station (1002) for further cleaning of the unwoven fabric (200).

On a Jeti Tauro™, manufactured by AGFA NV, troubles were found for mounting cloth (300) directly on its vacuum belt because of insufficient suction of vacuum power in this printing device and because of difficulties for avoiding wrinkles which crashes against a print head (505) of this printing device. The present invention is a solution for it by extending said printing device with an unwoven fabric (200), configured as second vacuum belt.

Cloth (300) is preferably a flexible material comprising a network of natural and/or artificial fibres (yarn or thread) such as cotton, flag fabrics, knitted polyester fabrics or even carpet.

The cloth (300) has in the present invention two sides a back side having fibers and filaments and a front side. Said back side having fibers and filaments is preferably the side in contact with the unwoven fabric (200) and said front side is the side whereon an image is printed.

The cloth (300) of the present invention may also a cloth cut for manufacturing cloth articles such as a shirt instead of a web (=continuous sheet of cloth). Said cloth cut is also called a panel or a single piece of cloth. Said panels are mostly irregular shaped or having an edge with a sharp corner as can be read in U.S. Pat. No. 9,623,578B1 (AMAZON TECHNOLOGIES) wherein a method is described for on demand apparel manufacturing. The invention is an tremendous advantage for holding said irregular shaped panels or said panels having an edge with a sharp corner flat so no collisions against heads occur.

The Inkjet Printer

The present invention is related to an inkjet printer (500) but it may also any other printing device. Said printing device marks a pattern on a surface of a cloth (300), further described as front side of the cloth (300). The marking of a pattern on a surface is also called printing. The pattern represents an image which may be text, photograph, graphic or logo. The pattern is mostly the result of a halftoning method of the image such as an error-diffusion method or an amplitude modulation halftoning method. The pattern may have an achromatic or chromatic color.

The marking of the printing device may be done by any conventional printing technology such as offset printing, gravure printing, letterpress printing, screen printing. These conventional printing methods are all described in '*Chapter* 2. *Printing Technologies With Permanent Printing Master*', P204-448 in '*Handbook of Print Media, Technologies and Production Methods*' by Helmut Kipphan, ISBN 3-540-67326-1 Springer-Verlag Berlin Heidelberg New York, 2001. Such printing device is also called a conventional printing device.

Preferably the printing device in the present invention is a digital printing device such as an electrophotography-based, devices, iconography-based, magnetography-based, inkjet-based printing device. A digital printing device is sometimes called a printer and an inkjet-based printing device is sometimes called an inkjet printer (500). These digital printing methods are all described in '*Chapter* 4. *Printing Computer to . . . Technologies', 'Subchapter* 4.5 *Computer to Print*', P657-674, and 'Chapter 5. Printing Technologies without a Printing Plate (NIP Technologies)', P676-758 in '*Handbook of Print Media, Technologies and Production Methods*' by Helmut Kipphan, ISBN 3-540-67326-1 Springer-Verlag Berlin Heidelberg New York, 2001. The printing device may be a hybrid printing device wherein conventional printing technologies and digital and/or non-impact printing technologies are combined in a printing device.

A preferred printing technology for the present invention is thus an inkjet printing technology. The printing device from the present invention is thus preferably an inkjet printer (500) which is a printing device comprising an inkjet print head (505). The inkjet technology may be continuous inkjet or drop on demand inkjet which is preferably selected from the group thermal inkjet, piezo inkjet and electrostatic inkjet. The inkjet printer (500) is preferably a large-format inkjet printer (500) wherein printable width of more than 135 cm are common but also printable widths of more than 200 cm. An example of such large-format inkjet printer in a multi-pass inkjet printing method is Jeti Tauro™ manufactured by AGFA NV™ with a maximum printable width of 254 cm and which can accommodate for example rigid media up to 400 cm in length. An example of another large-format inkjet printer with a single-pass inkjet printing method is KBA RotaJet™ L-series with a maximum print width of 1.3 meter.

The inkjet printer (500) may comprise a page-wide inkjet print-head which covers the whole width or larger than the width of the cloth (300), a so called single pass inkjet printer. In a preferred embodiment the pattern is inkjet printed in one pass, also called single-pass inkjet printing method, which guarantees an economical benefit by having larger throughputs than in a multi-pass inkjet printing method. Detailed information on inkjet technologies and building-up of inkjet printers can be found in '*Inkjet Technology and Product Development Strategies*' by Stephen F. Pond, Torrey Pines, 2000.

To enhance the adhesion of the pattern on the cloth (300) the printing device may comprise a dryer to dry the marked pattern on the cloth (300) and/or to have a better adhesion of the marked pattern on the cloth (300). A typical dryer (510), sometimes also called curing device, in such printing devices comprises an ultraviolet light (UV) source and/or infrared (IR) radiation source.

The drying of the marked pattern may be done by radiation (UV and/or IR and/or NIR and/or SWIR) from the back-side to the printed side of the cloth (300). Or the drying of the marked pattern may be done by radiation (UV and/or IR and/or NIR and/or SWIR) above the marked pattern.

Any ultraviolet light source, as long as part of the emitted light, may be employed as a radiation source, such as a high or low pressure mercury lamp, a cold cathode tube, a black light, an ultraviolet LED, an ultraviolet laser, and a flash light.

The IR source is preferably a NIR source (=Near Infra-Red source) such as a NIR lamp or a SWIR (=Short Wave Infra-Red source) such as a SWIR lamp. The IR source may comprise carbon infrared emitters which has a very short response time. An IR source is also called infrared radiation source. The IR source may comprise an air blower for blowing hot air warmed up by the IR source.

The printing device of the present invention comprises, expressed in another way:

- a marking device, such as an inkjet head, for marking a cloth (300),
- a first vacuum belt (150), supported by a upstream pulley ($P_{upstream}$) and downstream pulley ($P_{downstream}$), comprising a print area ($A_{print}$) and vacuum area ($A_{vacuum}$).
- pair of sliding supports as support for the unwoven fabric (200), configured as a second vacuum belt, wherein the pair of sliding supports comprises a first sliding support (=upstream sliding support ($S_{upstream}$)) and a second sliding support (=downstream sliding support ($S_{downstream}$)); wherein the second sliding support ($S_{downstream}$) is constructed downstream the print area ($A_{print}$) or the vacuum area ($A_{vacuum}$); and wherein the first sliding support ($S_{upstream}$) is constructed upstream the print area ($A_{print}$) or the vacuum area ($A_{vacuum}$); and wherein the unwoven fabric (200), configured as a second vacuum belt, is supported in print area ($A_{print}$) or the vacuum area ($A_{vacuum}$). The sliding supports where over the unwoven fabric (200), configured as a second vacuum belt, is wrapped may each be comprised in a pulley.

The vacuum area ($A_{vacuum}$) preferably overlaps the print area ($A_{print}$) because the adhering by vacuum power while printing is of a big importance in print quality such as dot placement accuracy. The print area ($A_{print}$) (size and form) is mainly defined by the marking device and its movement (or not), such as a back and forth movable inkjet printhead in a multi-pass inkjet printer, and the vacuum area ($A_{vacuum}$) (size and form) is mainly defined by the apertures in the first vacuum belt (150) and the vacuum power of the vacuum table (900) underneath the first vacuum belt (150).

The print area ($A_{print}$) from the printing device of the present invention is preceded by an upstream area ($A_{upstream}$) wherein the cloth (300) is applied on the printing device and wherein the unwoven fabric (200), configured as a second vacuum belt, is coming on the first vacuum belt (150) at an upstream belt contact position ($C_{CB1,\ upstream,\ CB2}$). Said upstream belt contact position ($C_{CB1,\ upstream,\ CB2}$) is thus the contact position wherein the second vacuum belt comes on the first vacuum belt (150) which is at the upstream side of the printing device from the present invention.

The print area ($A_{print}$) from the printing device of the present invention is followed by a downstream area ($A_{downstream}$) wherein the cloth (300) is outputted from the printing device and wherein the unwoven fabric (200), configured as a second vacuum belt, is leaving the first vacuum belt (150) at a downstream belt contact position ($C_{CB1,\ downstream,\ CB2}$). Said downstream belt contact position ($C_{CB1,\ downstream,\ CB2}$) is thus the contact position wherein the unwoven fabric (200), configured as a second vacuum belt, leaves the first vacuum belt (150) which is at the downstream side of the printing device from the present invention.

The unwoven fabric (200), configured as a second vacuum belt, is leaving the upstream sliding support ($S_{upstream}$) at a upstream sliding support contact position ($C_{S,upstream}$). The unwoven fabric (200), configured as a second vacuum belt, is coming on the downstream sliding support ($S_{downstream}$) at a downstream sliding support contact position ($C_{S,\ downstream}$).

The inkjet printer (500) may comprise a coating device for applying a base coat on the cloth (300) when it is supported on said unwoven fabric (200) or for applying a top coat on the decorated cloth when it is supported on said unwoven fabric (200).

The print area ($A_{print}$) from the printing device of the present invention is preceded by an upstream area ($A_{upstream}$) wherein the cloth (300) is inserted in/on the printing device and wherein the cloth (300) is coming attached with the first vacuum belt (150) at an upstream belt contact position ($C_{CB1,\ upstream,\ printreceiver}$) and is coming on the unwoven fabric (200), configured as a second vacuum belt, at an upstream belt contact position ($C_{CB2,\ upstream,\ printreceiver}$).

- $C_{CB1,\ upstream,\ printreceiver}$ is thus the contact position wherein the cloth (300) comes attached with the first vacuum belt (150) which is at the upstream side of the printing device from the present invention.
- $C_{CB2,\ upstream,\ printreceiver}$ is thus the contact position wherein the cloth (300) comes on the second vacuum belt which is at the upstream side of the printing device from the present invention.

The print area ($A_{print}$) from the printing device of the present invention is followed by a downstream area ($A_{downstream}$) wherein the cloth (300) is outputted from the printing device and wherein the cloth (300) is leaving the first vacuum belt (150) at a downstream belt contact position ($C_{CB1,\ downstream,\ printreceiver}$) and is leaving the unwoven fabric (200), configured as a second vacuum belt, at a downstream belt contact position ($C_{CB2,\ downstream,\ printreceiver}$).

- $C_{CB1,\ downstream,\ printreceiver}$ is thus the contact position wherein the cloth (300) detaches from the first vacuum belt (150) which is at the downstream side of the printing device from the present invention.
- $C_{CB2,\ downstream,\ printreceiver}$ is thus the contact position wherein the cloth (300) leaves the second vacuum belt which is at the downstream side of the printing device from the present invention.

The First Vacuum Belt

The inkjet printer (500) of the present invention comprises two vacuum belts:

- a first vacuum belt (150) for conveying a second belt which is suitable for conveying under an inkjet print head (505) a cloth (300). The second vacuum belt is a vacuum belt and more preferably a vacuum belt made of an unwoven fabric (200).

A conveyor belt is a belt for conveying a load, such as a cloth (300). A conveyor belt has a support side whereon the print load is conveyed and a back side which is in contact with a pair of pulleys or gliding supports (805, 807).

There is a substantial parallel relationship to the longitudinal axis of these pulleys to convey the conveyor belt straight over these pulleys. These parallel pulleys are also called belt pulleys (905, 907). The first vacuum belt (150) is such a conveyor belt.

The width of the first vacuum belt (150) is the distance of the belt which is measured in the parallel direction as the pair of pulleys. The width of said belt is the distance between the edges of the conveyor belt across the conveyor belt parallel to these parallel pulleys.

The length of the first vacuum belt (150) is the distance of the belt which is measured perpendicular to the parallel direction as the pair of pulleys. It defines the length of the loop which is formed by said belt.

The minimum path of the first vacuum belt (150) is the minimum distance that said belt may convey over its pair of pulleys.

The conveying direction of the first vacuum belt (150) is the direction of conveying the belt which is perpendicular to a pair of pulleys whereon the belt is wrapped or looped. The conveying direction of the first vacuum belt (150) defines the path that belt is following over the wrapped pair of pulleys.

A pulley is a cylinder preferably mounted on a central axis rod. The pulley comprises a pulley cover which comes in contact with the first vacuum belt (150).

A pulley may comprise a belt guider to prevent or minimize swimming of the belt over the pair of pulleys. Swimming of a belt is a phenomenon that moves the pulley left to right or right to left over the pulley perpendicular the conveying direction.

The first vacuum belt (150) in the present invention is also wrapped around a vacuum table (900). The first vacuum belt (150) comprises therefore a plurality of apertures whereby a vacuum area ($A_{vacuum}$) can be created in the printing device by vacuum power of the vacuum table (900). Such a vacuum area may comprise a plurality of vacuum sub areas if for example the vacuum table (900) comprises a plurality of vacuum sub chambers. The first vacuum belt (150) is thus a permeable conveyor belt, more precisely an air-permeable conveyor belt, sometimes called a porous conveyor belt. The bottom of the first vacuum belt (150); which is the back side; is in contact with the vacuum table (900) and the top of the first vacuum belt (150); which is the support side; comprises a support zone for the unwoven fabric (200), configured as a second vacuum belt, in the present invention. The wrapping of a conveyor belt is sometimes in literature called 'looped' around its pulleys. In the present invention is the first vacuum belt (150) looped around a vacuum table (900) and a pair of pulleys, namely the upstream pulley ($P_{upstream}$) and the downstream pulley ($P_{downstream}$).

Preferably is the width of the first vacuum belt (150) between 1 meter and 10 meter, more preferably between 3 meter and 6 meter.

The printing device from the present invention comprises preferably adjustment means to align the longitudinal axis of the pair of pulleys ($P_{upstream}$ and $P_{downstream}$) of the present invention to become parallel to each other. Such adjustment means are well-known in the prior-art. Also the use of more than two pulleys where over the first vacuum belt (150) is wrapped is well-known in the prior-art especially extra pulleys to alter the tensioning of the conveyor belt or to control the conveyor belt to have a straight path over the wrapped pulleys.

A printing device with a vacuum belt to convey a print receiver for marking a pattern on it, is well-known in the state-of-the-art. An example of such printing device is Jeti Tauro™ manufactured by AGFA NV™.

Preferably the first vacuum belt (150) from the present invention has two or more layers of materials wherein an under layer provides linear strength and shape, also called the carcass and an upper layer called the cover or the support side. The carcass is preferably a woven fabric web and more preferably a woven fabric web of polyester, nylon, glass fabric or cotton. The material of the cover comprises preferably various rubber and more preferably plastic compounds and most preferably thermoplastic polymer resins. The cover of the first vacuum belt (150) is in a preferred embodiment of the present invention the side which is supporting the unwoven fabric (200), configured as a second vacuum belt, in a vacuum area ($A_{vacuum}$) of the printing device. The carcass of the first vacuum belt (150) is in a preferred embodiment of the present invention the side which is in contact with the pair of pulleys from the present invention. The carcass is in the present invention preferably urethane impregnated to minimize the noise of conveying and rubbing the first vacuum belt (150) over the pair of pulleys and over the vacuum table (900).

The support-side (top-side, cover) of the first vacuum belt (150) comprises preferably a thermoplastic polymer resin coated on a rough layer. The support area of the present invention is preferably abraded engineering plastic composition or comprises polyethylene terephthalate (PET), polyamide (PA), high-density polyethylene (HDPE), polytetrafluoroethylene (PTFE), polyoxymethylene (POM) and/or Polyaryletherketone (PAEK).

The top surface of the first vacuum belt (150) (thus the cover whereon the unwoven fabric (200), configured as a second vacuum belt, from the present invention is carried) comprises preferable hard urethane with a preferred thickness (measured from top surface to bottom surface) between 0.2 to 2.5 mm. The total thickness (measured from top surface to bottom surface) of the first vacuum belt (150) is preferably between 1.2 to 7 mm.

The first vacuum belt (150) may comprise a thermoplastic middle layer for easy looping around the pair of pulleys from the present invention.

The thickness of the first vacuum belt (150) is preferably between 1 mm and 5 mm; more preferably between 1.5 mm and 3.5 mm. The thickness of the first vacuum belt (150) is chosen to carry the second conveyor belt and the cloth (300) but especially for said loads a thickness between 2 mm and 3 mm preferred.

The pitch line of the first vacuum belt (150) is preferably below one third of the thickness of the first vacuum belt (150), more preferably below one fifth of the thickness of the first vacuum belt (150), measured from the back-side of the first vacuum belt (150), which is the side in contact of its wrapped pulleys.

The pitch line of the first vacuum belt (150) is preferably between 0 and 2 mm; more preferably between 0 and 1 mm and most preferably between 0.1 and 0.8 mm. These distances are measured from the back-side of the first vacuum belt (150), which is the side in contact of its wrapped pulleys.

Such a pitch line of the first vacuum belt (150) is important in the present invention to have a high marking accuracy; especially in printing device with a high print resolution and inkjet printing devices comprising inkjet heads which are capable of jetting small droplets less than 12 pL. The pitch line is the plane within a conveyor belt which undergoes neither stretching nor compression when the belt rounds the pulley, i.e., the neutral plane of the belt structure.

To have a better sucking the unwoven fabric (200), configured as a second vacuum belt, from the present invention together with the first vacuum belt (150) on the vacuum table (900) from the present invention the first vacuum belt (150) has than a plurality of holes so that the air can be directed and sucked through the first vacuum belt (150). The plurality of these holes may be small in size, preferably from 0.3 to 10 mm in diameter, more preferably from 0.4 to 5 mm in diameter, most preferably from 0.5 to 2 mm in diameter and preferably spaced evenly apart on the first vacuum belt (150) preferably 3 mm to 50 mm apart, more preferably from 4 to 30 mm apart and most preferably from 5 to 15 mm apart to enable the creation of uniform vacuum pressure that sucks the unwoven fabric (200), configured as a second vacuum belt, together with the first vacuum belt (150).

The first vacuum belt (150) is tensioned between the pair of pulleys from the present invention. The tensioning may be caused by aligning the parallel pulleys and/or widen the distance between the longitudinal axes of the pair of pulleys in the present invention. This tensioning of the first vacuum belt (150) is important for heavy print receivers and for heaving correct print alignment of the marked pattern.

The mounting of the first vacuum belt (150) in the printing device asks for a demanding procedure wherein the tensioning over the pair of pulleys is measured and controlled for example by widening the longitudinal axes from each other. Both edges (left and right) of the conveyor belt are also controlled to calculate the swim and/or drift of the conveyor belt over the pair of pulleys. By adapting the tensioning, the swim and/or drift is controlled. The stability of the drift and/or swim and tensioning of the first vacuum belt (150) is subsequently controlled for more than one hour (=relaxation phase). If some deformations in the first vacuum belt (150) are seen in this demanding procedure; a wait time of twelve hours are needed for relaxation of the first vacuum belt (150) where after the whole procedure had to be restarted.

The effective tensile force on the first vacuum belt (150) has to be at least equal or even greater than the required force for slippage-free conveying.

The tensioning of the first vacuum belt (150) may be controlled by attaching an extra pulley whereon the first vacuum belt (150) is wrapped and which may be angled versus the longitudinal axes of the pair of pulleys. Such an extra pulley is sometimes called an alignment pulley or an align roller.

The conveying of the first vacuum belt (150) is preferably driven by a motor; more preferably an electric stepper motor; to produce a torque to one of its pulley from the pair of pulleys so by friction on the first vacuum belt (150) and the powered pulley the cloth (300) and unwoven fabric (200), configured as a second vacuum belt, from the present invention is conveyed in a conveying direction. The use of an electric stepper motor makes the transport of a cloth (300) more controllable e.g. to change the speed of conveying and move the load on the vacuum belt in successive distance movements. An example of a conveying belt with an electric stepper motor is described for the media transport of a wide-format printer in EP1235690 (ENCAD INC). A preferred embodiment comprises a system for conveying of the first vacuum belt (150) with successive distance movements; also called discrete step increments to transport the cloth (300) and unwoven fabric (200), configured as a second vacuum belt.

Another way of conveying the first vacuum belt (150) is by a belt step conveyor system with high accurate position capabilities due to a moving belt gripper mounted on a linear movement system to convey the first vacuum belt (150) in successive distance movements while the moving belt gripper engaged the first conveying belt and the moving belt gripper is moved from a home position to an end position by the linear movement system. The first vacuum belt (150) is stagnated by the engaging of a stagnating belt gripper while the moving belt gripper moves back to its home position else the stagnating belt gripper has released the conveyor belt. An example of such conveyor system is disclosed in WO2014184226 (AGFA NV).

Any of a variety of encoder mechanisms can be employed for controlling linefeed distances while conveying the first vacuum belt (150). Typically, a rotary encoder is connected to a belt drive roller; belonging to the pair of pulleys. The information provided by the encoder is processed by the printing device to control the linefeed distance.

The printing device may comprise multiple conveyor belts as the first vacuum belt (150) for example with a different amount of apertures to create different vacuum force.

A preferred first vacuum belt for the present invention is disclosed in US20180264851 (AGFA NV) or more preferred first vacuum belt for the present invention is disclosed in EP3266619 (AGFA NV).

Vacuum Table

A vacuum table (900) is a vacuum support. A vacuum chamber comprised in the printing device of the present invention hold-downs a cloth (300) against said vacuum table (900). The cloth (300) and said vacuum table (900) are 'sandwiching' the first vacuum belt (150) and the unwoven fabric (200), configured as a second vacuum belt, Preferably the vacuum table (900) in the embodiment comprises a set of air-channels to provide a pressure differential by a vacuum chamber at the support layer of the vacuum table (900) to create a vacuum area ($A_{vacuum}$) and at the bottom-surface of the printing table a set of apertures which are connected to the set of air-channels. These apertures at the bottom layer may be circular, elliptical, square, rectangular shaped and/or grooves, such as slits, parallel with the bottom layer of the vacuum table (900).

The support layer of the printing table should be constructed to prevent damaging of a cloth (300) or vacuum support if applicable. For example, the apertures at the support layer that are connected with the air-channels may have rounded edges. The support layer of the printing table may be configured to have low frictional specifications.

The top-surface, also called the support surface, of the vacuum table (900) or a portion of the vacuum table (900), such as the inner side of its air-channels may be coated to have easy cleaning performances e.g. as result of dust or ink leaks. The coating is preferably a dust repellent and/or ink repellent and/or hydrophobic coating. Preferably the top-surface of the vacuum table (900) or a portion of the vacuum table (900), such as the inner side of its air-channels, is treated with an ink repelling hydrophobic method by creating a lubricious and repelling surface which reduces friction.

A vacuum-support-air-channel is an air-channel from the support surface to the bottom surface of the vacuum support. It is also called a suction-hole if the perimeter of the vacuum-support-air-channel at the support surface is substantially circular.

The area of a vacuum-support-air-channel at the support surface of the vacuum support is in the present invention preferably between 0.3 $mm^2$ and 5 $mm^2$. More preferably the perimeter of the vacuum-support-air-channel at the support surface has the same shape as a circle, ellipse, oval, rectangle, triangle, square, rectangle, pentagon, hexagon, heptagon, octagon or any polygon containing at least three sides.

The vacuum-support-air-channel is preferably tapered in the direction of the bottom surface for optimal vacuum pressure effect at the support surface.

The distribution of air-channels on the support surface of the vacuum support is preferably between 1 air-channel per $dm^2$ and 100 air-channels per $dm^2$; more preferably between 5 air-channels per $dm^2$ and 50 per $dm^2$.

The perimeter of a suction-hole is preferably from 0.3 to 10 mm in diameter, more preferably from 0.4 to 5 mm in diameter, most preferably from 0.5 to 2 mm in diameter The vacuum-belt-air-channels in the air-sucking zone; also called vacuum area ($A_{vacuum}$); are preferably spaced evenly apart on the vacuum support preferably 3 mm to 50 mm apart, more preferably from 4 to 30 mm apart and most preferably from 5 to 15 mm apart to enable the creation of uniform vacuum pressure that holds the cloth (300) together with the vacuum support.

A vacuum chamber is a rigid enclosure which is constructed by many materials preferably it may comprise a metal. The choice of the material is based on the strength, pressure and the permeability. The material of the vacuum chamber may comprise stainless steel, aluminium, mild steel, brass, high density ceramic, glass or acrylic.

A vacuum pump provides a vacuum pressure inside a vacuum chamber and the vacuum pump is connected by a vacuum pump connector, such as a tube, to a vacuum pump input such as aperture in the vacuum chamber. Between the vacuum pump connector, a vacuum controller, such as a valve or a tap, may be provided to control the vacuum in a sub-vacuum chamber wherein the aperture is positioned.

A preferred vacuum table for the present invention is disclosed in U.S. Pat. No. 9,962,963 (AGFA NV). Another preferred vacuum table for the present invention is disclosed in U.S. Pat. No. 9,573,393 (AGFA NV).

The Second Vacuum Belt

The inkjet printer (500) of the present invention comprises two vacuum belts:

- a first vacuum belt (150) for conveying a second belt which is suitable for conveying under an inkjet print head (505) a cloth (300). The second vacuum belt is a vacuum belt and more preferably a vacuum belt made of an unwoven fabric (200). The unwoven fabric (200), configured as a second vacuum belt, in the present invention has the function of supporting a cloth (300) in the present invention. Said second vacuum belt is hereby wrapped around minimum two sliding supports, which may be pulleys. The unwoven fabric (200), configured as a second vacuum belt, is actually looped around the first vacuum belt (150) and in the same direction of the first vacuum belt (150). The use of said second vacuum belt may be called a twin conveyor belt principle or double conveyor belt principle.

The area for applying the cloth (300) on the second vacuum belt is preferably larger than the cloth (300) and preferably flat. Said cloth (300) covers partly said second vacuum belt to have good adherence at the edges of said cloth (300). When said second vacuum belt is even sized than said cloth (300) and said cloth is fully covering said belt, an edge of said cloth (300) can crimp (wavy or curl) due to the tufted back side having fibers and filaments and its adherence while applying the vacuum which goes through the first and second vacuum belt. This may result in a collision against a print head (505) of the inkjet printer (500).

The second vacuum belt comprises one or more fibrous layers wherein the back side having fibers and filaments of the cloth (300) preferably is contact with a fibrous layer from said one or more fibrous layers. Said fibrous layer attaches easily to said fibrous and tufted back side having fibers and filaments. Said fibrous layer may be coated and/or is an unwoven fabric (200) such as felt. Said felt may be wool felt but preferably it is a polyester felt. Also recycled polyester felt may be used. Polyester felt are most preferred because said felts have a tighter construction and they can be used in operating temperature above 30° C. Polyester felt may be blended with other materials such as wool.

To minimize the vacuum power for the air suction in the present invention the air-permeability of the second vacuum belt may be at 200 Pa difference pressure between 30 and 120 L/($dm^2$×min) preferably between 35 and 90 L/($dm^2$×min). Said air-permeability can be measured with an AKUSTRON™ air permeability tester which follows industry standards DIN 53887, DIN 53120, ISO9237 and ASTM D 737-96. The air-permeability is thus measured in minutes, abbreviated as 'min'.

If the second vacuum belt comprises a plurality of layers on top of each other, one or more of said layers is a fibrous layer but preferably all layers are fibrous. Said layers needs to be also air-permeable. The air-permeability of said second vacuum belt is measured on all said multiple layers. Preferably a first layer from said plurality of layers in contact with the back side having fibers and filaments is having a smaller air-permeability than a second layer, which is a subsequent layer of the first layer. Most preferably a subsequent layer of a layer of the plurality of layers has a higher air-permeability.

If the layer in contact with the back side having fibers and filaments is an unwoven fabric (200), the orientation of the fibres of said unwoven fabric (200) and said fibres which comes in contact with said back side having fibers and filaments maybe adapted to have a better adherence with said fibrous and tufted back side having fibers and filaments. In a preferred embodiment the first vacuum belt (150) has a conveying direction; the cloth (300) has a back side having fibers and filaments and the unwoven fabric (200) having hairs which are oriented parallel to said conveying direction for hooking up with said back side having fibers and filaments.

The good holding and easy fixing of the cloth (300) by the present invention can be even more efficient wherein the second conveyor belt comprises a register mark for arranging the cloth (300) or more than one cloths on said belt. The second conveyor belt may also comprise register means for aligning the cloth (300) on said support. Said register mark may be a ruler, a grid of n×m small squares or one or more small lines for easy registering said cloth (300) or even more than one cloth (300). Said mark may comprise an identification code or means for calculating distances. Said register means may also a registration pin or registration bar.

For easy handling and having a certain stiffness the second vacuum belt the weight is preferably between 0.6 and 2.5 kg/m2. The thickness of said belt is than preferably between 1.5 mm and 4 mm, more preferably between 1.5 mm and 3 mm. In a preferred embodiment is the thickness of the second vacuum belt twice or more than the thickness of the supported cloth (300) but more preferably the thickness of the second vacuum belt is not more than 100 times the thickness of the supported cloth (300).

Also heat pressing of the decorated cloth may be performed in the manufacturing line when said cloth is still attached with said back side having fibers and filaments to the second vacuum belt. The manufacturing line of the present invention comprises than also heat press for said heat pressing. Hereby is the cloth (300) preferably a cloth which is more preferably base coated prior printing a decorated image and which is most preferably top coated after printing said image by a coating device, which is then part of the manufacturing line. Said base coat, cloth (300), decorative image and top coat may than be sandwiched together by said heat pressing step.

The conveying is preferably with successive distance movements, also called discrete step increments which is caused by the conveying of the first vacuum belt (150).

After the printing-step in the present invention the second vacuum belt may be cleaned. This may be performed by a support cleaner comprising:

a receptacle for a cleaning-liquid; and a cleaning-roll, which is in contact with said second vacuum belt; wherein the cleaning-roll preferably comprises an elongated carpet fabric which is helical enfold around the cleaning-roll and in which the pile is composed of yarn tufts in loop and/or cut configuration; and wherein the cleaning-roll comprises a helical channel along the length of the enfolded carpet fabric for draining the cleaning-liquid from the cleaning-roll and/or for wetting the cleaning-roll by the cleaning-liquid. A cleaning step may be performed while conveying. A well-known manufacturer of cleaning-rolls is TEKNEK™ where the receptacle for a cleaning-liquid is not needed because the use of an adhesive layer on the cleaning-roll.

The cleaning-roll, such as a roll with an adhesive layer, is preferably positioned after the downstream sliding support contact position. A cleaning roll may also be used in the inkjet printer for cleaning the cloth before printing.

The support side of the second vacuum belt, which is in the present invention the side in contact with the back side having fibers and filaments may be impregnated and/or coated with PUR and/or glue. Also the other side, which shall be in contact with the first conveyor belt may also be impregnated for better sliding for example impregnation with PUR. But coating or impregnating the fibrous layer in contact with the back side having fibers and filaments is less preferred because then the fibres on top of said layer hooks less with said back side having fibers and filaments.

When one or more cloths (=panels) are supplied on the second vacuum belt, the position may be scanned by a camera-system (1004) above said second vacuum belt. Said camera-system (1004) is then part of the inkjet printer (500) of the present invention. If said second vacuum belt has a registration mark or registration means or an identification code said scanning can be used for optimizing the supply chain of the decorated cloths of the present invention. In post-processing of the decorated cloth said identification code and positions of said one or more cloths can be used for example in cutting if they are still on said second vacuum belt.

If said second vacuum belt has a non-woven fabric as fibrous layer according a preferred embodiment and the post-processing is cutting in the cloth (300) wherein it is still on said second vacuum belt, the damage of said support by said cutting is minimal. Said non-woven fabric is then preferably polyester felt. Hereby is the second vacuum belt reusable for the following print job for decorating cloth according the present invention.

In a preferred embodiment the cloth (300) comprises a mating hole which matches a head portion of a registration pin supplied to the second vacuum belt. Said registration pin is preferably manufactured from a stainless steel, aluminium or plastic material. The mating hole in the cloth (300) may be added to the cloth, preferably near an edge of said cloth (300), by punching said cloth (300) for example with a perforator. The edge of a cloth (300) is mostly lower in quality, especially when said cloth (300) is a half hide or whole hide. The mating hole may also be used in post processing the inkjet-printed cloth for registration such as cutting in panels.

To avoid collisions with the print heads of the inkjet printer (500), a head portion of a register means, such as said registration pin, extends above the cloth (300) to a height smaller than the throw distance of said print heads, preferably to a height between 0.1 mm and 3 mm. A bottom portion of said register means may have means for supplying the registration pin into the second vacuum belt for example by screwing or drilling or piercing. If said supply of a registration pin is done in the fibrous layer from the previous embodiments, such as unwoven fabric (200), said pin can easily be removed without leaving a significant hole. Said second vacuum belt may be reused several times wherein said pin is (re)positioned more than once.

The unwoven fabric (200), configured as a second vacuum belt, is also wrapped around a pair of sliding supports (805, 817) which are substantially parallel to each other. The sliding supports are also substantially parallel to the pair of pulleys where around the first vacuum belt (150) from the present invention is wrapped. In a preferred embodiment of the present invention is a sliding support, from the pair of sliding supports, part from a pulley (815, 817), more preferably the pair of sliding supports is another pair of pulleys, thus not the pair of pulleys where over the first vacuum belt (150) is wrapped. Such pulley of the another pair of pulleys; which comprises a sliding support from the present invention; may be unrotatable but preferably rotatable around its longitudinal axis. The rotation of the pulley is in the present invention preferably performed by friction of the unwoven fabric (200), configured as a second vacuum belt, while transporting by the first vacuum belt (150). The rotation of the pulley may be driven by a motor for example for easy handling the unwoven fabric (200), configured as a second vacuum belt, on the first vacuum belt (150) or lightly controlling the transport direction and movement of the unwoven fabric (200), configured as a second vacuum belt.

In order to better understand the invention: the pair of sliding supports ($S_{upstream}$ and $S_{downstream}$) is mounted outside the first vacuum belt (150), so the first vacuum belt (150) is not wrapped around the pair of sliding supports and the pair of sliding supports are no part of the pair of pulleys whereon the first vacuum belt (150) from the present invention is wrapped and so the first vacuum belt (150) is not in contact with the pair of sliding supports (805, 807).

The unwoven fabric (200), configured as a second vacuum belt, is at its back-side in contact, possibly through an air-flow of an air-cushion system, comprised in a sliding support, with these pair of sliding supports; which may be another pair of pulleys. The side from a sliding support whereon the unwoven fabric (200), configured as a second vacuum belt, from the present invention is supported is called the support surface or support side of the sliding support.

The unwoven fabric (200), configured as a second vacuum belt, may be wrapped also around an extra pulley or extra plurality of pulleys, such as dancer rollers, which are not in contact with the first vacuum belt (150) and constructed outside the first vacuum belt (150).

Due to the rotation of the unwoven fabric (200), configured as a second vacuum belt; which is in contact by suction in a vacuum area ($A_{vacuum}$) from the first vacuum belt (150) while rotating the first vacuum belt (150) around its pair of pulleys ($P_{upstream}$, $P_{downstream}$) from the present invention; a cloth (300) on the unwoven fabric (200), configured as a second vacuum belt, is conveyed in the printing device between a sliding support, also called the upstream sliding support ($S_{upstream}$) and another sliding support, also called the downstream sliding support ($S_{downstream}$). The pair of sliding supports (805, 807); where over the unwoven fabric (200), configured as a second vacuum belt, is wrapped; includes the upstream sliding support ($S_{upstream}$) and the downstream sliding support ($S_{downstream}$). Analogue the pair of pulleys, where over the first vacuum belt (150) is wrapped, includes an upstream pulley ($P_{upstream}$) and downstream pulley ($P_{downstream}$) wherein between the unwoven fabric (200), configured as a second vacuum belt, is conveyed and thus also the cloth (300). The marking of the cloth (300) is performed between the upstream sliding support ($S_{upstream}$) and the downstream sliding support ($S_{downstream}$).

The conveying direction of the first vacuum belt (150), cloth (300) and unwoven fabric (200), configured as a second vacuum belt, is determined from upstream zone to downstream zone, from the upstream sliding support ($S_{upstream}$) to the downstream sliding support ($S_{downstream}$) and from the upstream pulley ($P_{upstream}$) to the downstream pulley ($P_{downstream}$).

The width of the unwoven fabric (200), configured as a second vacuum belt, is the distance of the unwoven fabric (200), configured as a second vacuum belt, which is measured in the parallel direction as the pair of sliding supports. The width of the unwoven fabric (200), configured as a second vacuum belt, is the distance between the edges of the unwoven fabric (200), configured as a second vacuum belt, across the unwoven fabric (200), configured as a second vacuum belt, parallel to these parallel sliding supports. The width of said unwoven fabric (200) is preferably between 1 m and 10 m. Multiple cloths may be placed on said unwoven fabric (200) next to each other. The inkjet printer (500) may have movable alignment pins which slides over a media setbar to be fixed at desired positions. An alignment pins aligns one of said multiple cloths. Jeti Tauro™, manufactured by AGFA NV, has such pin configuration to print on aligned multiple cloths with a so called media set bar.

The length of the unwoven fabric (200), configured as a second vacuum belt, is the distance of the unwoven fabric (200), configured as a second vacuum belt, which is measured perpendicular to the parallel direction as the pair of sliding supports. It defines the length of the loop which is formed by the unwoven fabric (200), configured as a second vacuum belt.

The conveying direction of the unwoven fabric (200), configured as a second vacuum belt, is the direction of conveying the unwoven fabric (200), configured as a second vacuum belt, which is perpendicular to a pair of sliding supports whereon the unwoven fabric (200), configured as a second vacuum belt, is wrapped or looped. The conveying direction of the unwoven fabric (200), configured as a second vacuum belt, defines the path that conveyor belt is following over the wrapped pair of sliding supports.

A sliding support may comprise a belt guider to prevent or minimize swimming of the unwoven fabric (200), configured as a second vacuum belt, over the pair of sliding supports which is left-to-right/right-to-left movement of the unwoven fabric (200), configured as a second vacuum belt, in a direction perpendicular the conveying direction of the unwoven fabric (200), configured as a second vacuum belt.

The printing device from the present invention comprises preferably adjustment means to align the longitudinal axis of the pair of sliding supports of the present invention to become parallel to each other.

The printing device may comprise multiple conveyor belts as the unwoven fabric (200), configured as a second vacuum belt, for example and as preferred embodiment with different glue to create different glue zones depending on the print receivers carried on these multiple conveyor belts as the unwoven fabric (200), configured as a second vacuum belt. The multiple conveyor belts are then also wrapped around the pair of sliding supports from the present invention.

In a preferred embodiment the unwoven fabric (200), configured as a second vacuum belt, comprises a ruler and/or indexer which may be used for measuring the movement and/or speed of the unwoven fabric (200), configured as a second vacuum belt, for example by a sensor, such as an encoder and an optical linear encoder, or measuring the sizes of the cloth (300). The signals from the sensor, such as an optical linear encoder, after reading the ruler and/or indexer determines in a control system the position of the unwoven fabric (200), configured as a second vacuum belt, or the speed of the unwoven fabric (200), configured as a second vacuum belt, and indirectly the position of cloth (300) carried on the unwoven fabric (200), configured as a second vacuum belt. The encoder may have a digital resolution between 0.01 micrometer and 250 micrometer, more preferably a digital resolution between 0.01 and 50 micrometer and most preferably a digital resolution between 0.01 and 10 micrometer. Especially when the unwoven fabric (200), configured as a second vacuum belt, moves in successive distance movements such small digital resolutions are important to calculate from the encoder signals the real successive distance movements. The ruler and/or indexer may be comprised on the support side of the unwoven fabric (200), configured as a second vacuum belt; which is the side in connection with the cloth (300) and/or on the back side of the unwoven fabric (200), configured as a second vacuum belt; which is the side in connection with the first vacuum belt (150).

In a preferred embodiment of the present invention the unwoven fabric (200), configured as a second vacuum belt, is hanging, more preferably freely hanging, between the downstream sliding support ($S_{downstream}$) and the upstream sliding support ($S_{upstream}$). The tension between the downstream and upstream sliding support ($S_{upstream}$) is preferably lower than the tension on the first vacuum belt (150) from the present invention and more preferably untensioned between the downstream and upstream sliding support ($S_{upstream}$). For clarification the tension means in here the force on the conveyor belt along the conveying direction, also called the conveying-direction-tension. An extra advantage of a lower tensioning or untensioned conveying of the unwoven fabric (200), configured as a second vacuum belt, between the downstream and upstream sliding support ($S_{upstream}$) is that the life-time of the unwoven fabric (200), configured as a second vacuum belt, is enlarged.

The total sum of tension inside the unwoven fabric (200), configured as a second vacuum belt, is preferably lower than the total sum of tension inside the first vacuum belt (150) especially while printing.

If the tensioning of the unwoven fabric (200), configured as a second vacuum belt, is equal or higher versus the first vacuum belt (150) it is found that the unwoven fabric (200), configured as a second vacuum belt, generates easily crinkles and/or unpredicted internal tensions which results in position changes of the cloth (300) on top of the unwoven fabric (200), configured as a second vacuum belt. Such position changes reduced the print quality of the printed patterns or may collapse the cloth (300) against the marking device or dryer from the printing device. Also it makes it harder to apply an unwoven fabric (200), configured as a second vacuum belt, around the first conveyor belt and the upstream sliding support ($S_{upstream}$) and downstream sliding support ($S_{downstream}$) so the total sum of tension inside the unwoven fabric (200), configured as a second vacuum belt, is preferably lower than the total sum of tension inside the first vacuum belt (150) especially while printing.

The Pressure Device

The pressure device in the present invention is for applying a pressure against said cloth (300) on the second vacuum belt and thus also the first vacuum belt (150) of the present invention.

Said pressure device comprises in the present invention a portion for traversing said cloth (300) with a rub by a relative movement between said pressure device and said second vacuum belt, carrying said cloth (300).

The portion traverses hereby a side of the cloth (300) wherein it moves along the surface of said side with pressure (=rub) during a period. Said period is preferably more than 50 μs. Said device for pressing the cloth (300) on the unwoven fabric (200) is thus not a roll which is results in a very short contact pressing (≠rub). Said so called point contact is found not to be effective enough for good holding on said unwoven fabric (200). A roll may be even result in curling the cloth (300) along the surface of the roll.

Preferably said portion is a flat portion is angled towards the second vacuum belt for example configured as a slit. The flat portion may also be a flat spring or box spring. If the portion is a flat portion, it is preferably suitable for traversing the cloth (300) with a rub while conveying said cloth (300) on the second vacuum belt. The angle between said flat portion and second vacuum belt is preferably smaller than 65°, more preferably smaller than 30°. Said angle is minimum 0.5°.

The flat portion is preferably resilient wherein said flat portion becomes (nearly) parallel with the second vacuum belt of the present invention when said portion traverses a cloth (300) with a rub by a relative movement between the pressure device and said second vacuum belt, carrying said cloth (300). Due said resilience less scratches, caused by said portion, occur on the cloth (300).

The flat portion is preferably made of or comprising: metal, steel, polyethylene terephthalate (PET), polyamide (PA), high-density polyethylene (HDPE), polytetrafluoroethylene (PTFE), polyoxymethylene (POM) and/or Polyaryletherketone (PAEK).

An end of the portion, which comes in contact with a cloth (300) when said portion traverses the cloth (300) with a rub by a relative movement between the pressure device and the second vacuum belt, is preferably rounded to prevent scratches on the cloth (300) or comprises a soft block to shield off the sharp end of said portion.

The inkjet printer (500) preferably comprises a height regulator for adapting the distance between the portion and the first vacuum belt (150). The thickness of cloths may differ so said height regulator is advantageous to control the pressing of said cloths against the second vacuum belt. The unwoven fabric (200), especially the felt and the cloth (300) are compressible which makes said pressure feasible.

Base Coats

The base coat applied on cloth (300 provides a level of image quality commensurate to the luxury aspect of cloth as the low viscosity of inkjet inks lets them penetrate rapidly into the cloth resulting in a reduced image quality.

The base coat may be applied as a single layer, or may be applied as multiple layers. The multiple layers may even have a different composition for improving properties like adhesion or flexibility.

The base coat preferably includes a polymer or copolymer based on polyurethane, as this has been found to improve flexibility to the printed cloth. The base coat preferably further includes a polyamide polymer or copolymer, as polyamide has been found to improve the compatibility with the cloth and to improve the strength of the base coat. The base coat is preferably applied by spraying, but may be applied by any coating technique known, such as knife coating, extrusion coating, slide hopper coating and curtain coating. It can be applied prior to attaching the cloth (300) to the non-woven fabric, configured as vacuum belt, if the present invention or it may be applied when the cloth (300) is already attached to said non-woven fabric.

The base coat may be transparent, but is preferably an opaque base coat. If an opaque base coat is applied when the cloth (300) is already attached to the non-woven fabric, then preferably measures are taken to either not spray or coat the area of the non-woven fabric where an identifier, registration means, registration pin, registration bar, ruler or a positioning marker is located, or otherwise to cover them prior to spraying or coating with, for example, a removable piece of tape. This way the identifier or the positioning marker can still be observed by the human eye.

The base coat may be a white base coat to enhance the colour vibrancy of the inkjet printed image, but preferably the base coat has a colour similar to that of the back side and the front side of the cloth. Any desired colour may be chosen for the base coat, such as red, green, brown, black, blue . . . .

Top Coats

A top coat may be applied onto the decorative image and/or the base coat for enhancing the scratch resistance of the decorative image.

The top coat may be applied as a single layer, or may be applied as multiple layers. The multiple layers may even have a different composition for improving properties like scratch resistance.

The protective top coat may have the same or a similar composition as the base coat. Usually the protective top coat is somewhat optimized according to the cloth application.

The top coat preferably includes a cross-linker and a polymer or copolymer based on polyurethane and/or polyamide.

Adhesives

In a less preferred embodiment, an adhesive is applied on the unwoven fabric (200), configured as second vacuum belt. To secure the holding more than only with vacuum power. The adhesive hereby forms a sticky layer on said second vacuum belt. The most preferred embodiment of the present invention is a second vacuum belt without said sticky layer. The amount of adhesive needed for said secure holding is less than using the sticky single conveyor belt principle from the state-of-the-art.

Said adhesive is used for attaching a cloth (300) with its back side having fibers and filaments to the second vacuum belt of the present invention. The adhesive may be applied to said second vacuum belt, to the cloth (300) of to both of them.

Any adhesive known in the art can be used in the present invention, going from classical known adhesives to biomimic based adhesives.

Repositionable adhesives are preferred, as they facilitate the process for ensuring that the cloth is attached completely flat on the carrier causing no collision with the inkjet print heads. Removable pressure sensitive adhesives are also known from applications such as the Post-It™ notes from 3M.

There is no limitation on the way of applying the adhesive to a surface, which may be e.g. by coating or by spraying. Repositionable spray adhesives are preferred as they cause no or very limited damage to the back side having fibers and filaments upon separating the carrier from the cloth. A commercial example of a suitable spray adhesive is the 3M™ Repositionable 75 Spray Adhesive. Spray adhesives are also known as aerosol adhesives.

Pigmented Inkjet Inks

The one or more pigmented inkjet inks that are inkjet printed may be selected from aqueous pigmented inkjet inks, solvent based pigmented inkjet inks and radiation curable pigmented inkjet inks. However, the one or more pigmented inkjet inks are preferably one or more radiation curable inkjet ink, most preferably one or more UV curable inkjet inks.

The one or more pigmented inkjet inks preferably contain organic colour pigments as they allow for obtaining a high colour gamut on cloth (300). Carbon black and titanium dioxide are inorganic pigments, which can be advantageously used in the present invention for composing black respectively white pigmented inkjet inks.

In a preferred embodiment, the one or more pigmented inkjet inks form a CMYK(W) or CRYK(W) inkjet ink set.

The invention claimed is:

1. An inkjet printer for printing on a cloth comprising:

a first vacuum belt for conveying an unwoven fabric which is configured as a second vacuum belt, and wherein said second belt is adapted to convey under an inkjet print head said cloth; and a device for applying pressure to said cloth on said second vacuum belt; wherein said device comprises a portion for traversing said cloth with a rub by a relative movement between said pressure device and said second vacuum belt, carrying said cloth, wherein the unwoven fabric is a felt and has an air permeability below 90 L/(dm$^2$×min), wherein the first vacuum belt has a conveying direction, and wherein the cloth has a back side having fibers and filaments and the unwoven fabric having hairs which are oriented parallel to said conveying direction for hooking up with said fibers and filaments.

2. The inkjet printer according to claim 1, wherein the unwoven fabric comprises a sticky layer for adhering the cloth on the unwoven fabric.

3. The inkjet printer according to claim 2, wherein the inkjet printer comprises a guider for guiding the second vacuum belt whereby the second vacuum belt has a straight conveying path.

4. The inkjet printer according to claim 2, wherein the device comprises a height regulator for adapting the distance between the portion of said device and the first vacuum belt.

5. The inkjet printer according to claim 2, wherein the unwoven fabric comprises a register mark for arranging the cloth on said unwoven fabric.

6. The inkjet printer according to claim 2, wherein the second vacuum belt is wrapped around the first vacuum belt and supported by minimum two sliding supports.

7. The inkjet printer according to claim 2, wherein the unwoven fabric comprises register means for aligning the cloth on said unwoven fabric.

8. The inkjet printer according to claim 2, wherein the cloth is a continuous sheet of cloth.

9. The inkjet printer according to claim 2, wherein the inkjet printer comprises a guider for guiding the second vacuum belt whereby the second vacuum belt has a straight conveying path.

10. The inkjet printer according to claim 1, wherein the portion is a flat portion which is angled towards the second vacuum belt.

11. The inkjet printer according to claim 10, wherein the flat portion is suitable for traversing the cloth with a rub while conveying said cloth on the second vacuum belt.

12. The inkjet printer according to claim 1, wherein the portion is a flat spring or a box spring.

13. The inkjet printer according to claim 12, wherein the flat portion is suitable for traversing the cloth with a rub while conveying said cloth on the second vacuum belt.

14. The inkjet printer according to claim 1, wherein the inkjet printer comprises a guider for guiding the second vacuum belt whereby the second vacuum belt has a straight conveying path.

15. The inkjet printer according to claim 1, wherein the device comprises a height regulator for adapting the distance between the portion of said device and the first vacuum belt.

16. The inkjet printer according to claim 1, wherein the unwoven fabric comprises a register mark for arranging the cloth on said unwoven fabric.

17. The inkjet printer according to claim 1, wherein the second vacuum belt is wrapped around the first vacuum belt and supported by minimum two sliding supports.

18. The inkjet printer according to claim 1, wherein the unwoven fabric comprises register means for aligning the cloth on said unwoven fabric.

19. The inkjet printer according to claim 1, wherein the cloth is a continuous sheet of cloth.

20. The inkjet printer according to claim 1, wherein the inkjet printer comprises a guider for guiding the second vacuum belt whereby the second vacuum belt has a straight conveying path.

* * * * *